United States Patent
Chiba et al.

(10) Patent No.: US 7,982,781 B2
(45) Date of Patent: Jul. 19, 2011

(54) IMAGE PROCESSING DEVICE, IMAGE PROCESSING METHOD, AND IMAGING APPARATUS

(75) Inventors: Takuya Chiba, Tokyo (JP); Ryota Kosakai, Tokyo (JP); Akira Matsui, Kanagawa (JP)

(73) Assignee: Sony Corporation (JP)

( * ) Notice: Subject to any disclaimer, the term of this patent is extended or adjusted under 35 U.S.C. 154(b) by 1429 days.

(21) Appl. No.: 11/471,360

(22) Filed: Jun. 20, 2006

(65) Prior Publication Data

US 2007/0013786 A1 Jan. 18, 2007

(30) Foreign Application Priority Data

Jun. 21, 2005 (JP) ................ P2005-180266
Jun. 19, 2006 (JP) ................ P2006-169322

(51) Int. Cl.
*H04N 5/228* (2006.01)
(52) U.S. Cl. .................... 348/222.1
(58) Field of Classification Search ............... 348/222.1, 348/272–283
See application file for complete search history.

(56) References Cited

U.S. PATENT DOCUMENTS

| | | | | |
|---|---|---|---|---|
| 3,935,588 A | * | 1/1976 | Uno | 348/285 |
| 5,513,281 A | * | 4/1996 | Yamashita et al. | 382/278 |
| 5,555,023 A | * | 9/1996 | Maenaka et al. | 348/253 |
| 5,563,652 A | * | 10/1996 | Toba et al. | 348/207.99 |
| 6,215,525 B1 | * | 4/2001 | Fujino | 348/452 |
| 6,278,803 B1 | * | 8/2001 | Ohashi | 382/254 |
| 6,295,087 B1 | * | 9/2001 | Nohda | 348/234 |
| 6,426,773 B1 | * | 7/2002 | Suzuki | 348/272 |
| 6,665,667 B2 | * | 12/2003 | Inaba et al. | 707/5 |
| 7,218,354 B2 | * | 5/2007 | Tanaka | 348/448 |
| 7,477,803 B2 | * | 1/2009 | Tajima | 382/300 |
| 2002/0076121 A1 | * | 6/2002 | Shimizu et al. | 382/300 |
| 2003/0185464 A1 | * | 10/2003 | Maenaka et al. | 382/300 |
| 2004/0263684 A1 | * | 12/2004 | Tanaka | 348/448 |
| 2006/0222269 A1 | * | 10/2006 | Ohno | 382/300 |

FOREIGN PATENT DOCUMENTS

| | | |
|---|---|---|
| JP | 10-150668 A | 6/1998 |
| JP | 11-177994 A | 7/1999 |
| JP | 2002-315012 A | 10/2002 |
| JP | 2004-299055 A | 10/2004 |
| JP | 2004-364201 A | 12/2004 |
| JP | 2005-094119 A | 4/2005 |
| JP | 2005-107037 A | 4/2005 |

* cited by examiner

*Primary Examiner* — Nhan T Tran
*Assistant Examiner* — Tuan H Le
(74) *Attorney, Agent, or Firm* — Lerner, David, Littenberg, Krumholz & Mentlik, LLP

(57) ABSTRACT

An image processing device includes a correlation value calculating unit calculating plural correlation values indicating degrees of correlation of an image for a pixel of attention to be interpolated on a solid-state imaging device having filters of predetermined color coding; a judging unit judging a direction in which interpolation should be performed by calculating, in different directions, at least two patterns of the plural correlation values calculated by the correlation value calculating unit and comparing the correlation values of at least two patterns with correlation lines obtained by plotting the correlation values with respect to straight lines of various angles; and an interpolating unit applying interpolation processing to the pixel of attention on the basis of information on pixels around the pixel of attention present in the direction judged by the judging unit.

23 Claims, 14 Drawing Sheets

(a) S_H = 1.0
S_NH = 0.5
(b) S_H = 0.5
S_NH = 1.0
(c) S_H = 0.0
S_NH = 0.5
(d) S_H = 0.5
S_NH = 0.0
(e) S_H = 1.0
S_NH = 0.5

(a) S_H = 1.0
    S_NH = 0.5

(b) S_H = 0.5
    S_NH = 1.0

(c) S_H = 0.0
    S_NH = 0.5

(d) S_H = 0.5
    S_NH = 0.0

(e) S_H = 1.0
    S_NH = 0.5

FIG. 17
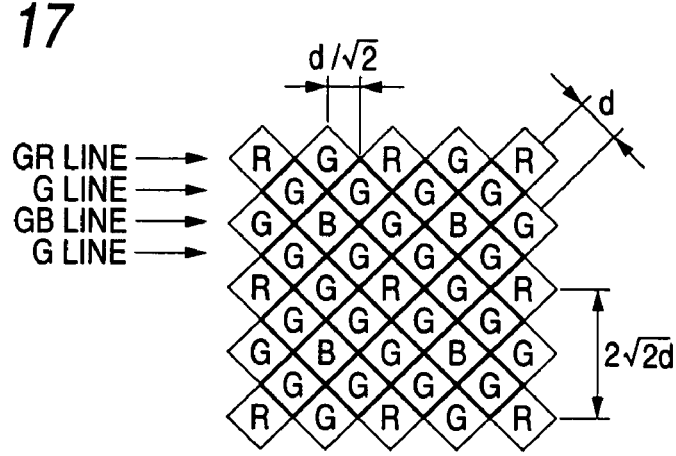
FIG. 18
FIG. 19
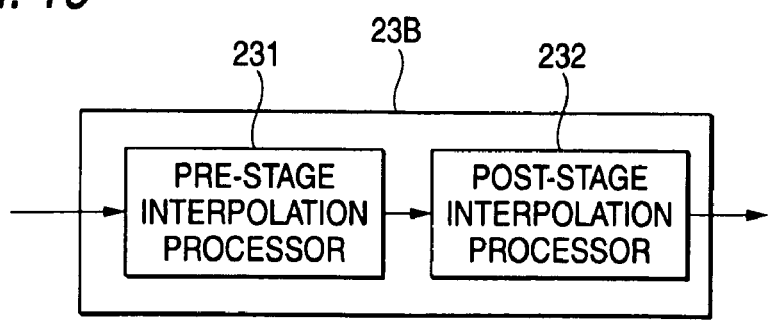

IMAGE PROCESSING DEVICE, IMAGE PROCESSING METHOD, AND IMAGING APPARATUS

CROSS-REFERENCE TO RELATED APPLICATIONS

This application claims priority from Japanese Patent Application Nos. JP 2005-180266 filed on Jun. 21, 2005 and JP 2006-169322, the disclosures of which are hereby incorporated by reference herein.

BACKGROUND OF THE INVENTION

1. Field of the Invention

The present invention relates to an image processing device, an image processing method, and an imaging apparatus, and, more particularly to an image processing device and an image processing method for processing an output signal of a solid-state imaging device having a filter of predetermined color coding (a color filter), and an imaging apparatus that uses the image processing device or the image processing method.

2. Description of the Related Art

In recent years, image qualities of imaging apparatuses such as a digital still camera and a video camera have been improved and imaging apparatuses of various specifications have been proposed. As a representative example, there is known a 3CCD imaging apparatus that obtains high-resolution RGB signals by arranging primary color filters of red (R), green (G), and blue (B) in the same spatial phase with respect to three solid-state imaging devices and realizes a high image quality. However, the 3CCD imaging apparatus needs to use the three solid-state imaging devices and use a prism for dissolving incident light into colors of R, G, and B. This makes it difficult to realize a reduction in size and a reduction in cost.

On the other hand, there is also known a 1CCD imaging apparatus that realizes a reduction in size and a reduction in cost by appropriately arranging color filters of R, G, and B in pixel units in one solid-state imaging device. In order to obtain high luminance resolution in this 1CCD imaging apparatus, a color arrangement in arranging the color filters of R, G, and B in pixel units in one solid-state imaging device is important. A characteristic of the solid-state imaging device varies depending on a way of the arrangement of the color filters. As a representative color coding (color arrangement), for example, there is known the Bayer arrangement that has been widely used.

(Bayer Arrangement)

As shown in FIG. 24, the Bayer arrangement is color coding in which color filters of R and color filters of G are alternately arranged in odd number rows and color filters of G and color filters of B are alternately arranged in even number rows. The Bayer arrangement has a characteristic that resolution of G is higher than resolution of R and B because a larger number of color filters of G are arranged compared with the color filters of R and B.

In general, a luminance signal Y is generated according to Expression (1) below.

$$Y=0.6G+0.3R+0.1B \qquad (1)$$

As it is evident from Expression (1), G is a main component in generating the luminance signal. Human being has a visual sensitivity characteristic that resolution for luminance is high and resolution for color is low. It can be said that the Bayer arrangement is a color arrangement that successfully utilizes the visual sensitivity characteristic of human being.

However, the color coding of the Bayer arrangement is not always optimum for human being. This is because human eyes have a characteristic that it is possible to recognize a high frequency for luminance but it is difficult to recognize a high frequency for color.

In signal processing of an imaging apparatus, generation of a luminance signal or a color difference signal from RGB signals having spatially different phases is a cause of generation of a false color signal. Thus, luminance signal processing and color difference signal processing have to be performed after generating RGB signals having the same spatial phases. Therefore, it is important to generate the RGB signals in the same spatial phase from the RGB signals having the spatially different phases according to the interpolation technique. If the interpolation is not optimum, for example, an image having high resolution is not obtained or a false color signal is generated.

In order to perform the interpolation processing, in the past, amounts of change in eight pixels in total near a pixel of attention, that is, pixels above and below, on the right and the left, and at the upper right, the lower right, the upper left, and the lower left of the pixel of attention are calculated. The amounts of change calculated are weighted to calculate correlation values. Interpolation coefficients are determined on the basis of the correlation values calculated. Interpolation data are multiplied by the interpolation coefficients, respectively, and, then, the interpolation data multiplied by the interpolation coefficients are added up. (See, for example, JP-A-11-177994).

However, in the related art described above, the interpolation processing is performed using correlation values calculated by weighting amounts of change in eight pixels in total above and below, on the right and the left, and at the upper right, the lower right, the upper left, and the lower left of a pixel of attention. Thus, a direction of correlation can only be detected in horizontal, vertical, and 45° directions with respect to the pixel of attention. This makes it difficult to perform appropriate interpolation processing.

Therefore, it is desirable to provide an image processing device, an image processing method, and an imaging apparatus that are capable of performing appropriate interpolation processing by judging a direction of correlation in all the directions (360°) with respect to a pixel of attention to be interpolated.

SUMMARY OF THE INVENTION

According to an embodiment of the invention, plural correlation values indicating degrees of correlation of an image are calculated for a pixel of attention to be interpolated on a solid-state imaging device having filters of predetermined color coding; a direction in which interpolation should be performed is judged by calculating at least two patterns of the plural correlation values calculated in different directions and comparing the correlation values of at least two patterns with correlation lines obtained by plotting the correlation values with respect to straight lines of various angles; and, on the basis of information on pixels around the pixel of attention present in the direction judged, interpolation processing is applied to the pixel of attention.

In the interpolation processing in the image processing device, a direction in which interpolation should be performed is judged by comparing plural correlation values with correlation lines. Thus, it is possible to judge a direction of correlation in all the directions (360°). On the basis of information on pixels around a pixel of attention present in the direction judged, the interpolation processing is applied to the pixel of attention.

BRIEF DESCRIPTION OF THE DRAWINGS

In the accompanying drawings:

FIG. 17 is a diagram showing a second example of color coding subjected to interpolation processing according to a second embodiment of the invention;

FIG. 18 is a diagram representing the second example of color coding as a square lattice;

FIG. 19 is a block diagram showing an example of a constitution of an interpolation processor that executes the interpolation processing according to the second embodiment;

FIG. 20 is a diagram showing a result of interpolation processing by a pre-stage interpolation processor;

FIG. 21 is a diagram showing a result of interpolation processing by a post-stage interpolation processor;

DETAILED DESCRIPTION

Embodiments of the invention will be hereinafter explained in detail with reference to the accompanying drawings.

Figure 1:
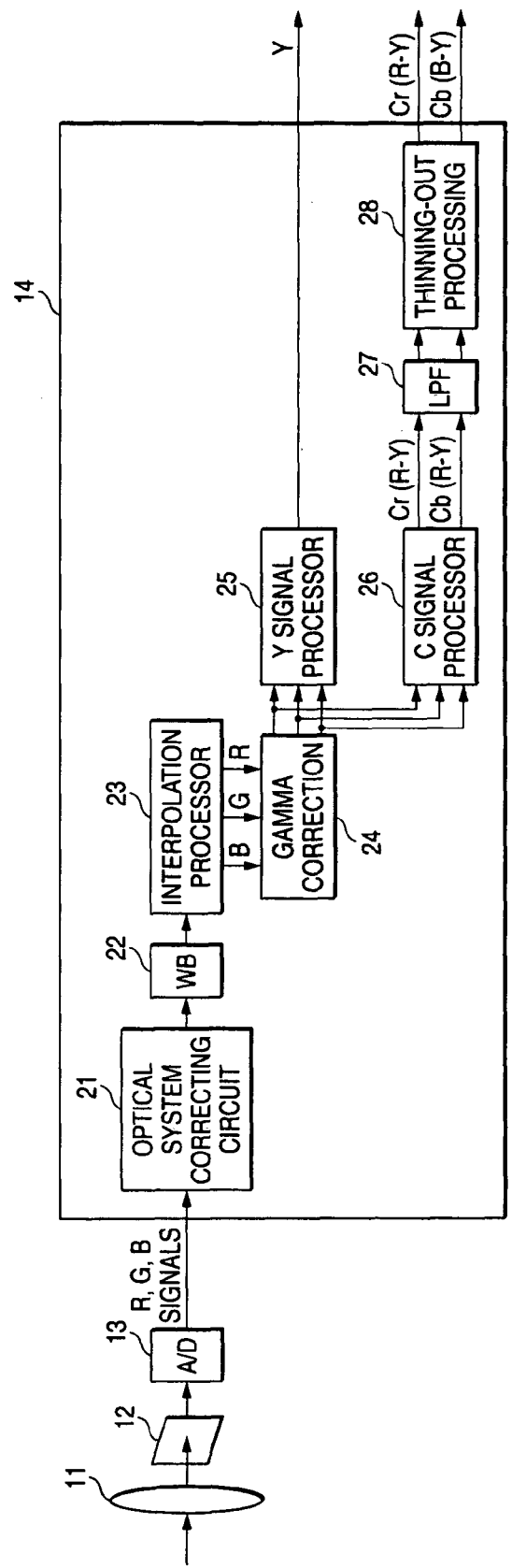
FIG. 1 is a block diagram showing an example of a constitution of an imaging apparatus that uses an image processing device or an image processing method according to an embodiment of the invention.

FIG. 1 is a block diagram showing an example of a constitution of an imaging apparatus that uses an image processing device or an image processing method according to an embodiment of the invention.

The imaging apparatus refers to camera modules including a solid-state imaging device serving as an imaging device, an optical system that focuses image light of a subject on an imaging surface (a light-receiving surface) of the solid-state imaging device, and a signal processor for the solid-state imaging device, camera apparatuses such as a digital still camera and a video camera, and electronic apparatuses such as a cellular phone.

In FIG. 1, an image light from a subject (not shown) is focused on an imaging surface of an imaging device 12 by an optical system, for example, an imaging lens 11. A solid-state imaging device is used as the imaging device 12. In the solid-state imaging device, a large number of pixels including photoelectric conversion elements are two-dimensionally arranged in a matrix shape and a color filter including color components serving as main components in creating a luminance component and other components is arranged on the surface of the pixels. The solid-state imaging device having the color filter may be a charge transfer solid-state imaging device represented by a Charge Coupled Device (CCD) solid-state imaging device or an X-Y addressable solid-state imaging device represented by a Metal Oxide Semiconductor (MOS) solid-state imaging device.

In the following explanation, in a color filter, color components serving as main components in creating a luminance (Y) component are explained with green (G) as an example and other color components are explained with red (R) and blue (B) as examples. However, the invention is not limited to a combination of these colors. It is also possible to use, for example, white, cyan, or yellow as the color components serving as the main components in creating the Y component and use, for example, magenta, cyan, or yellow as the other color components.

Only light of the respective color components of the image light made incident on the imaging device 12 passes through the color filter to be made incident on the respective pixels. The light made incident on the respective pixels is photoelectrically converted by a photoelectric conversion element such as a photodiode. The light is read out as analog image signals from the respective pixels, converted into digital image signals by an A/D converter 13, and, then, inputted to a camera signal processor 14, which is the image processing device according to the embodiment of the invention.

The camera signal processor 14 includes an optical system correction circuit 21, a White Balance (WB) circuit 22, an interpolation processor 23, a gamma correction circuit 24, a Y (luminance) signal processor 25, a Chroma (C) signal processor 26, a band limiting Low-Pass Filter (LPF) 27, and a thinning-out processor 28.

The optical system correction circuit 21 performs correction for the imaging device 12 and the optical system such as digital clamp for adjusting a black level to a digital image signal inputted to the camera signal processor 14, defect correction for correcting a defect of the imaging device 12, and shading correction for correcting a fall in an amount of ambient light of the imaging lens 11.

The WB circuit 22 applies processing for adjusting a white balance to make R, G, and B the same for a white subject to the image signal that has passed through the optical system correction circuit 21. The interpolation processor 23 creates pixels with different spatial phases according to interpolation. In other words, the interpolation processor 23 creates three planes (RGB signals in the same spatial position) from RGB signals with phases shifted from one another spatially. Specific interpolation processing in the interpolation processor 23 is a characteristic of the embodiments of the invention. Details of the interpolation processing will be described later.

The gamma correction circuit 24 applies gamma correction to the RGB signals in the same spatial position and, then, supplies the RGB signals to the Y signal processor 25 and the C signal processor 26. The Y signal processor 25 generates a luminance (Y) signal according to Expression (1) described above. The C signal processor 26 generates color difference signals Cr(R−Y) and Cb(B−Y) according to Expressions (2) and (3) below.

$$Cr(R-Y)=R-(0.3R+0.6G+0.1B) \quad (2)$$

$$Cb(B-Y)=B-(0.3R+0.6G+0.1B) \quad (3)$$

The band limiting LPF 27 is a filter having a cut-off frequency that is ⅛ of a sampling frequency fs. The band limiting LPF 27 reduces a pass band from (½) fs to (⅛) fs for the color difference signals Cr and Cb. This is an output adjusted to a TV signal format. When the color difference signals Cr and Cb are outputted without being subjected to band limitation, a frequency signal equal to or higher than ⅛ fs is outputted as a false color signal. The thinning-out circuit 28 performs thinning-out for sampling of the color difference signals Cr and Cb.

What is important is that the color (C) signal (the color difference signals Cr and Cb) need only a band equal to or smaller than ¼ of a band for the luminance (Y) signal. This is because the color (C) signal is determined according to the format of the TV signal and, besides, as described above, human eyes have a characteristic that it is possible to recognize a high frequency for luminance but it is difficult to recognize a high frequency for a color.

Actually, when a difference between a case of Y:Cr:Cb=4:4:4 (output bands of Y and C are the same) and a case of Y:Cr:Cb=4:1:1 is viewed on an output image, it is difficult to identify the difference in a usual subject other than a special subject, for example, points source of light of red and blue. In other words, it is seen that, as defined in the TV signal format, sufficient resolution is obtained for the C signal with only a band ¼ of a band width of the Y signal.

The interpolation processing in the interpolation processor 23, which is the characteristic part of the embodiment of the invention, will be described.

As described above, the interpolation processing is processing for creating pixels with different spatial phases according to interpolation. The interpolation processing is extremely important for obtaining an image with high resolution. This is because, when interpolation is not successfully performed by the interpolation processing, a false signal is generated to cause a fall in resolution and generation of a false color. As the interpolation processing for obtaining high resolution, interpolation processing using correlation processing has been performed.

Figure 2:
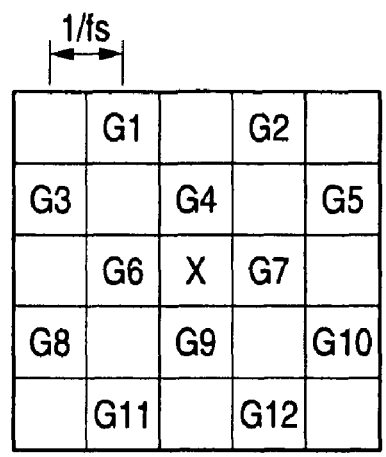
FIG. 2 is a diagram showing a pixel arrangement in which only pixels G are extracted in the Bayer arrangement.

The interpolation processing using the correlation processing is effective for processing in creating G signals in spatial positions such as a spatial position of a pixel X where color components G are not present in a solid-state imaging device in which the color components G are arranged in a checkered pattern like the Bayer arrangement as shown in FIG. 2.

Figure 3:
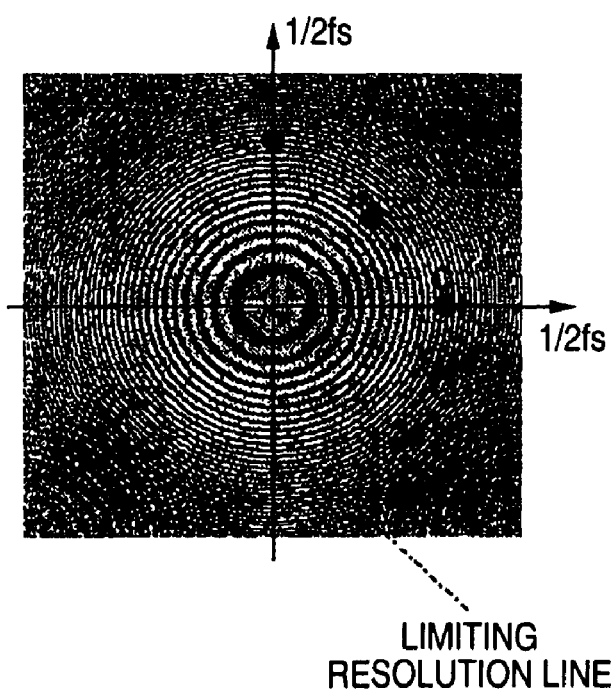
FIG. 3 is a diagram showing a resolution chart.
Figure 4:
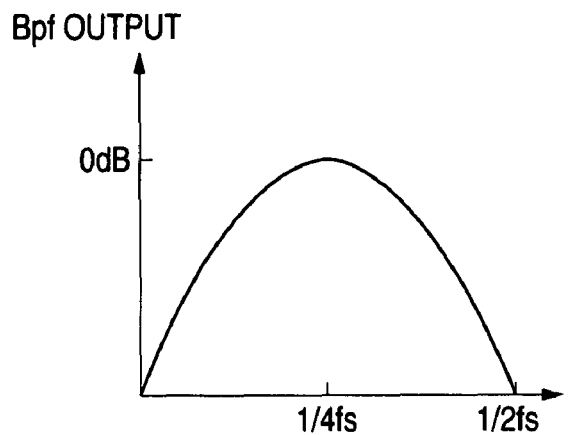
FIG. 4 is a graph showing a frequency characteristic of a band-pass filter.

The "correlation processing" is processing for interpolating a pixel of attention to be interpolated using information on pixels in a direction in which correlation is high. Specifically, for example, in the case in which a resolution chart shown in FIG. 3 is an input image, a pixel of attention is interpolated using pixels in the horizontal direction when a subject is a subject of horizontal lines as at an A point on the ordinate. The pixel of attention is interpolated using pixels in the vertical direction when a subject is a subject of vertical lines as at a C point on the abscissa. It is possible to realize high resolution by performing such interpolation processing.

Usually, interpolation is also applied to colors of R and B. However, in the embodiment of the invention, interpolation is processing that attaches importance to interpolation processing for G for realizing high resolution. Thus, although not specifically described here, it is also possible to apply the same interpolation processing to R and B or other colors, for example, cyan and yellow.

(Bayer Arrangement)

Interpolation processing for the Bayer arrangement will be described. As it is evident from FIG. 2, color components G of the Bayer arrangement are arranged in a checkered pattern. The interpolation processing is applied to portions where the color components G are not arranged in the Bayer arrangement. When the pixel of attention to be interpolated (hereinafter referred to as "interpolation pixel") X is interpolated, correlation values in the horizontal and the vertical directions are calculated to interpolate the interpolation pixel X.

First, filtering by a band-pass filter is applied in the horizontal and the vertical directions with the spatial position (the interpolation pixel) X as the center to calculate amplitude of a signal viewed in the horizontal and the vertical directions. The band-pass filter is a filter that has a peak at ¼ fs (fs: sampling frequency) and outputs a value with respect to a signal having a frequency up to a frequency near limiting resolution of ½ fs.

When a filter output in the horizontal direction of the band-pass filter is Bpf_H and a filter output in the vertical direction of the band-pass filter is Bpf_V, Bpf_H and Bpf_V are calculated as follows.

$$Bpf\_H=-(G3+G8)+2(G4+G9)-(G5+G10)$$

$$Bpf\_V=-(G1+G2)+2(G6+G7)-(G11+G12)$$

When the two outputs Bpf_H and Bpf_V of the band-pass filter are observed, at an A point in FIG. 3, Bpf_H=0 because lines at the A point are lines in the horizontal direction. At a B point, Bpf_H=Bpf_V because lines at the B point are lines in a 45° direction. At a point C, Bpf_V=0 because lines at the C point are lines in the vertical direction.

In other words, when an output of the band-pass filter is large in a certain direction, a signal having large amplitude in the direction is present. When an output of the band-pass filter is small in a certain direction, a signal with small fluctuation, that is, a signal with low frequency is present in the direction.

Correlation values S_H and S_V in the horizontal and the vertical directions are calculated from the following expressions using the outputs Bpf_H and Bpf_V of the band-pass filter.

$$S\_H=Bpf\_V/(Bpf\_H+Bpf\_V)$$

$$S\_V=1-S\_H$$

The correlation values S_H and S_V indicate degrees of correlation of images. "Correlation" means a fluctuation ratio of a signal. When the fluctuation ratio of a signal is large, correlation is low. When the fluctuation ratio of a signal is small, correlation is high.

For example, at the A point, since S_H=1 and S_V=0, it is possible to consider that a straight line component is present (no fluctuation/flat) in the horizontal direction. Since a fluctuation ratio of a signal is small, correlation is high in the horizontal direction and there is no correlation in the vertical direction. The correlation values S_H and S_V are represented by a ratio of the filter outputs Bpf_H and Bpf_V in the horizontal and the vertical directions of the band-pass filter. Interpolation with high resolution is realized by interpolating the interpolation pixel X with pixels in a direction in which a correlation value is large, that is, correlation is high.

At the B point, S_H=S_V=0.5. This indicates that correlations in the horizontal and the vertical directions are the same, or the same change in an image occurs in both the horizontal and the vertical directions. At the C point, S_H=0 and S_V=1. This indicates that correlation in the vertical direction is high.

Subsequently, an interpolation value X of the interpolation pixel X is calculated from the following expression.

$$X=\{(G6+G7)*S\_H+(G4+G9)*S\_V\}/2$$

As is seen from the above expression, interpolation processing is applied to the interpolation pixel X by applying a large weight to a direction in which correlation is high. For example, at the A point, since X=(G6+G7)/2, the interpolation pixel X is interpolated using pixels in the horizontal direction. At the B point, since X=(G6+G7+G4+G9)/4, the interpolation pixel X is interpolated with an equal weight using pixels in the horizontal and the vertical directions. At the C point, since X=(G4+G9)/2, the interpolation pixel X is interpolated using pixels in the vertical direction.

It is possible to realize high resolution by interpolating the interpolation pixel X while applying weight to (weighting) components of pixels in a direction in which a change in amplitude of an image signal is small, or a direction in which correlation is high, using the correlation processing as described above.

Figure 5:
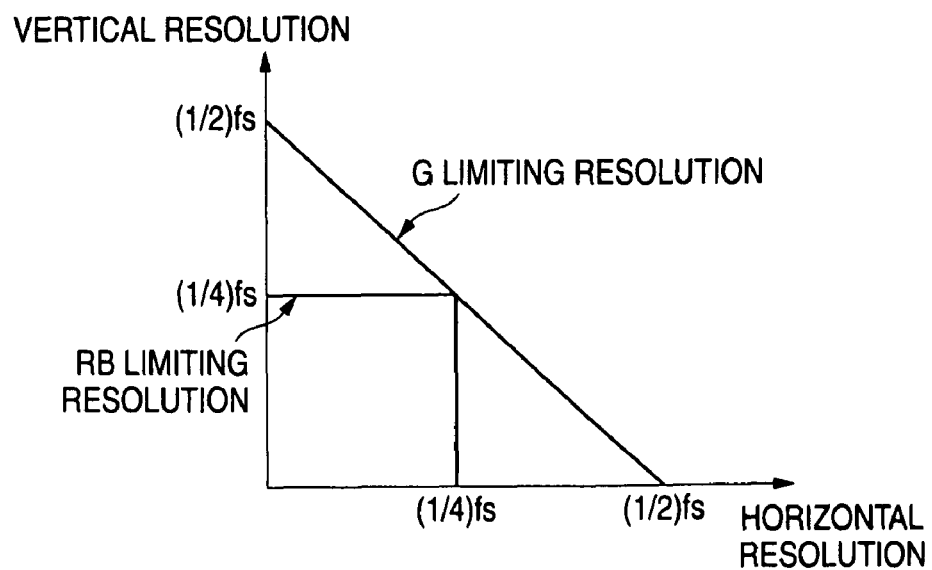
FIG. 5 is a graph showing limiting resolutions of G resolution and RB resolution in the Bayer arrangement.

In the Bayer arrangement, limiting resolutions of resolution of G and resolution of RB are calculated from an arrangement of pixels as shown in FIG. 5. The resolution of G is ½ fs in the horizontal and the vertical directions and (½√2) fs in the 45° direction. In particular, the resolution of G and the resolution of RB are the same in the 45° direction.

According to Expressions (1) to (3), G is a main component in creating a luminance signal and depends largely on luminance resolution and RB depends largely on resolution of a color difference signal. Thus, an increase of resolution for G is important in generating an image with high resolution. In the case of the Bayer arrangement, as described above, human eyes have a characteristic that it is possible to recognize a high frequency for luminance but it is difficult to recognize a high frequency for a color. Thus, a balance between color resolution and luminance resolution does not match the visual sensitivity characteristic of human being.

In view of such a point, in Japanese Patent Application No. 2005-107037, the applicant proposes color coding in which color resolution is slightly sacrificed but luminance resolution is substantially doubled by arranging color components (e.g., G) serving as main components in creating a luminance component to surround respective other color components (e.g., R and B) and increasing G instead of halving the number of pixels of R and B compared with the Bayer arrangement.

Such color coding matches the visual sensitivity characteristic of human being better than the color coding of the Bayer arrangement. In particular, in a signal processing system complying with an output format of Y:Cr:Cb=4:1:1, for example, in a signal processing system of a video camera or the like, the color coding in the band described above is more desirable. On the other hand, advanced interpolation processing is necessary in order to obtain higher resolution than that in the case of the color coding of the Bayer arrangement.

In the following description, first and second examples of color coding are explained as color coding in which components serving as main components in creating a luminance component, for example, G, are arranged to surround respective components of R and B. Interpolation processing for the first example of color coding and interpolation processing for the second example of color coding will be explained as a first embodiment and a second embodiment, respectively.

First Embodiment

Figure 6:
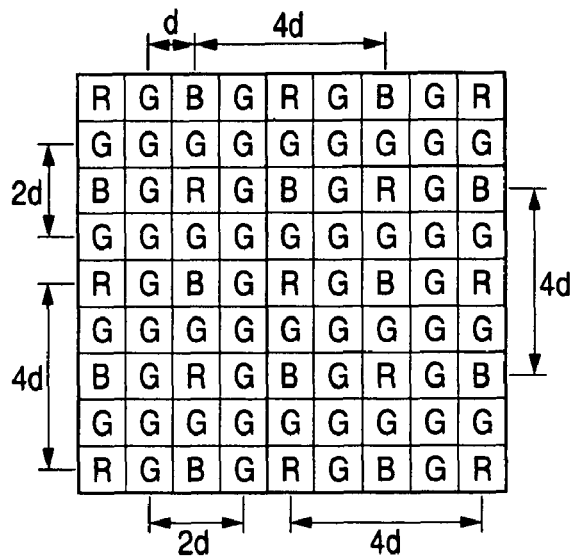
FIG. 6 is a diagram showing a first example of color coding subjected to interpolation processing according to a first embodiment of the invention.

FIG. 6 is a diagram showing the first example of color coding subjected to interpolation processing according to a first embodiment of the invention. As shown in FIG. 6, in the first example of color coding, pixels are arranged in a square lattice shape such that the pixels are arranged at equal intervals (pixel pitches) d in the horizontal direction (a direction along pixel rows; a row direction) and the vertical direction (a direction along pixel columns; a column direction). In a first row, pixels are arranged in repetition of RGBG with four pixels in the horizontal direction as a unit. In a second row, only pixels of G are arranged. In a third row, pixels are arranged in repetition of BGRG with four pixels in the horizontal direction as a unit. In a fourth row, only pixels of G are arranged. The following rows are arranged as repetition of these four rows.

In the first example of color coding, as it is evident from FIG. 6, color components (in this example, G) serving as main components in creating a luminance (Y) component and other color components (in this example, R and B) are arranged such that the color components G surround the color components R and B. The color components R and B are arranged at intervals of 4 d in the horizontal and the vertical directions.

In the first example of color coding with such a constitution, considering sampling rates in the horizontal and the vertical directions, when a sampling rate among the pixels is set to d corresponding to the pixel pitches, a sampling rate for G is d and a sampling rate for R and B is 2 d. In other words, the color components R and B are arranged in every other column (in this example, odd number columns) and every other row (in this example, odd number rows) such that sampling rates in the horizontal and the vertical directions are rates that are half the sampling rate for G. Therefore, resolution in the horizontal and the vertical directions of the color components G is twice as large as that of the color components R and B. Considering a sampling rate in the 45° direction, a sampling rate for G is d/2√2 and a sampling rate for R and B is 2 d/√2.

A spatial frequency characteristic will be considered. In the horizontal and the vertical directions, since the sampling rate for G is d, it is possible to catch a signal having a frequency up to (½) fs according to the sampling theorem. In the 45° direction, since the sampling rate for G is d/2√2, it is possible to catch a signal having a frequency up to (1/√2) fs according to the sampling theorem.

The color components R and B will be considered in the same manner. Since intervals of pixel arrangement of R and B are the same, only the component R will be described.

Concerning a spatial frequency characteristic of R, in the horizontal and the vertical directions, since the sampling rate for R is 2 d, it is possible to catch a signal having a frequency up to ¼ fs according to the sampling theorem. In the 45° direction, since the sampling rate for R is d/2√2, it is possible to catch a signal having a frequency up to (¼√2) fs according to the sampling theorem.

Figure 7:
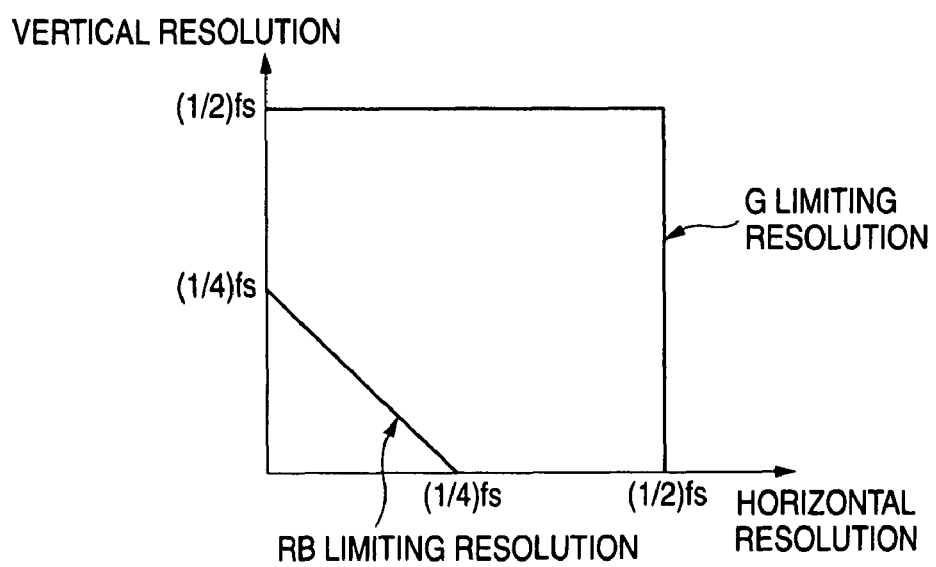
FIG. 7 is a graph showing limiting resolution of G resolution and RB resolution in the first example of color coding.

On the basis of the above description, a spatial frequency characteristic of the first example of color coding is shown in FIG. 7. The color components G can catch a signal having a frequency up to (½) fs in the horizontal and the vertical directions and a signal having a frequency up to (1/√2) fs in the 45° direction. The color components R and B can catch a signal having a frequency up to (¼) fs in the horizontal and the vertical directions and a signal having a frequency up to (¼√2) fs in 45° direction. In other words, as it is evident from a comparison of FIGS. 5 and 7, it is possible to obtain resolution with luminance resolution about twice as large as that of the Bayer arrangement by using the first example of color coding.

The first embodiment is characterized by correction processing for the first example of color coding in FIG. 6. The correction processing will be hereinafter specifically explained. A pixel arrangement in which only pixels G are extracted in the first example of color coding in FIG. 6 is shown in FIG. 8.

Figure 8:
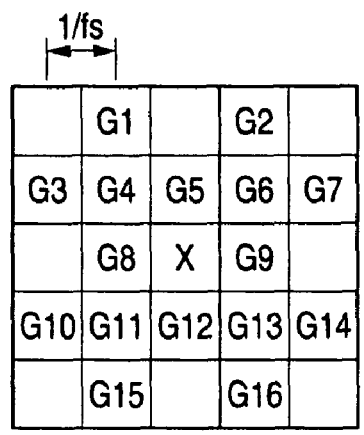
FIG. 8 is a diagram showing a pixel arrangement in which only pixels G are extracted in the first example of color coding.

In the pixel arrangement in FIG. 8, eight pixels G in the horizontal, the vertical, and the oblique directions around the interpolation pixel X, that is, pixels G4, G5, G6, G8, G9, G11, G12, and G13 are present. In the color coding of the Bayer arrangement, the pixels G are only present in the vertical and the horizontal four directions. On the other hand, in the first example of color coding in FIG. 6, the eight pixels are present in the horizontal, the vertical, and the oblique directions. When the interpolation pixel X is observed, it is seen that the pixels G are arranged in a grid pattern. This is very important in realizing high resolution.

As a characteristic of the interpolation processing according to the first embodiment, not only correlation in the horizontal and the vertical directions but also correlation in the oblique direction is calculated and the interpolation processing is performed while it is judged which pixels should actually be used for interpolation from a relation between the correlation in the horizontal and the vertical directions and the correlation in the oblique direction.

Figure 9:
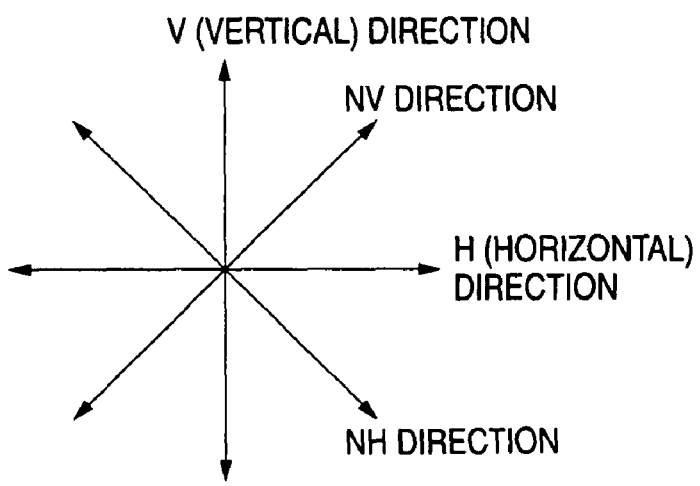
FIG. 9 is a diagram showing a relation among an H direction, a V direction, an NH direction, and an NV direction.
Figure 10:
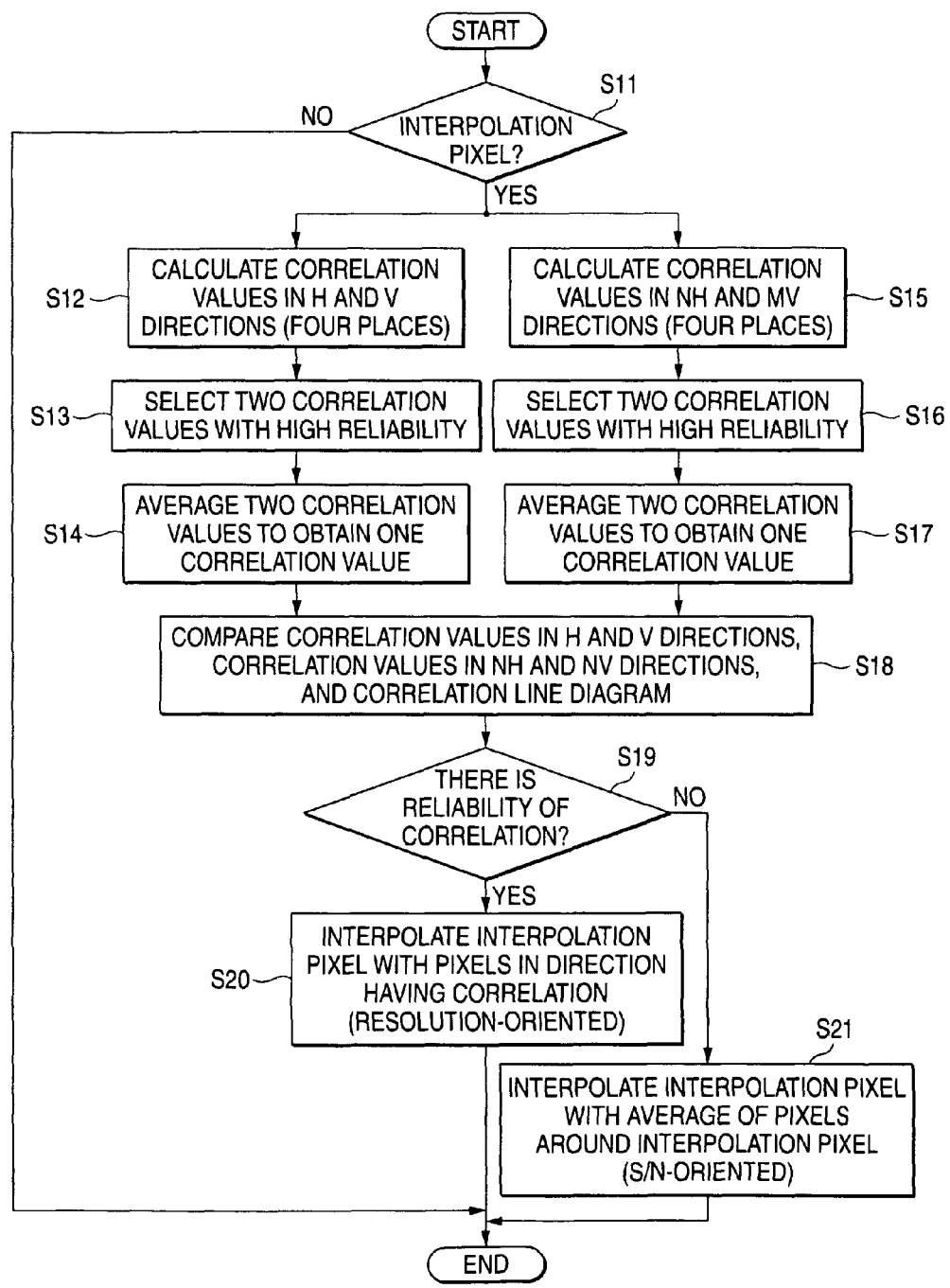
FIG. 10 is a flowchart showing a procedure of the interpolation processing according to the first embodiment of the invention.

A procedure of the interpolation processing according to the first embodiment will be hereinafter explained with reference to a flowchart in FIG. 10. As shown in FIG. 9, the horizontal direction is described as an H direction, the vertical direction is described as a V direction, an axial direction rotated to the right by 45° with respect to the H direction is described as an NH direction, and an axial direction rotated to the left by 45° with respect to the H direction is described as an NV direction.

Steps S11 and S12

Figure 11:
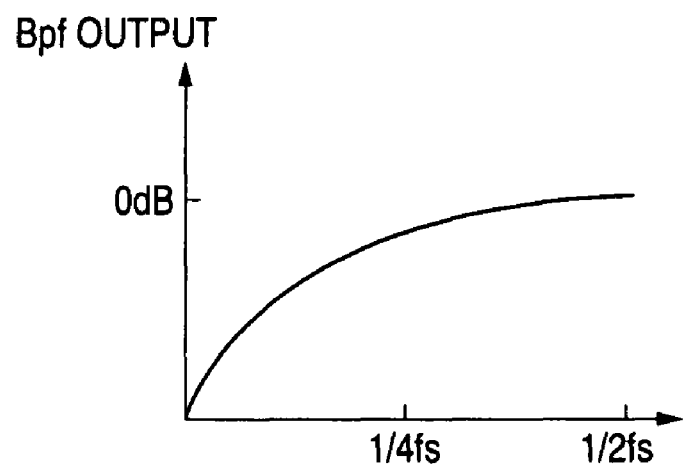
FIG. 11 is a graph showing a frequency characteristic of a band-pass filter in H and V directions.

The pixel X in FIG. 8 is set as an interpolation pixel (a pixel of attention to be interpolated) (step S11). First, correlation values in the H and the V directions are calculated (step S12). Specifically, correlation values in the H and the V directions are calculated by applying filtering by a band-pass filter in the H and the V directions with the pixel G4 at the obliquely upper left of the interpolation pixel X as the center. A frequency characteristic of the band-pass filter in the H and the V directions (a filter characteristic) is shown in FIG. 11.

When an output in the horizontal direction of the band-pass filter is Bpf_H_G4 and an output in the vertical direction of the band-pass filter is Bpf_V_G4, a filtering result indicated below is obtained.

$$Bpf\_H\_G4 = -G3 + 2G4 - G5$$

$$Bpf\_V\_G4 = -G1 + 2G4 - G8$$

A correlation value S_H_G4 in the H direction for the pixel G4 is calculated from a ratio of filter outputs Bpf_H and Bpf_V in the horizontal and the vertical directions of a band-pass filter having the same filter characteristic, specifically, from the following expression.

$$S\_H\_G4 = Bpf\_V/(Bpf\_H + Bpf\_V)$$

Concerning a correlation value S_V_G4 in the V direction, S_V_G4=1−S_H_G4. Thus, if only the correlation value S_H_G4 in the H direction is calculated, it is possible to easily calculate the correlation value S_V_G4. Thus, the correlation value S_V_G4 is not specifically calculated here.

In the series of processing, the correlation values S_H_G4 and S_V_G4 in the H and the V directions with the pixel G4 as the center are calculated. For example, when the correlation value S_H_G4 in the H direction is 1.0 and the correlation value S_V_G4 in the V direction is 0.0, a satisfactory result is obtained if the pixel X is interpolated with the correlation value S_V_G4 in the V direction.

In the same manner as the calculation of the correlation value S_H_G4 in the H direction with the pixel G4 in the obliquely upper left of the interpolation pixel X as the center, correlation values S_H_G6, S_H_G11, and S_H_G13 in the H direction with the pixel G6 at the obliquely upper right, the pixel G11 at the obliquely lower left, and the pixel G13 at the obliquely lower right as the centers, respectively, are also calculated.

According to the processing described above, that is, the processing in step S12, the correlation values S_G_G4, S_H_G6, S_H_G11, and S_H_G13 in the H and the V directions with the four pixels G4, G6, G11, and G13 around the interpolation pixel X as the centers are calculated.

Step S13

Correlation values applied to correction of the interpolation pixel X are selected out of the four correlation values S_H_G4, S_H_G6, S_H_G11, and S_H_G13. Specifically, two correlation values having highest correlation, that is, two correlation values having highest reliability, among the four correlation values are adopted as correlation values of the interpolation pixel X (step S13). This is based on the idea that correlation values are substantially the same in adjacent pixels.

To select the correlation values of the interpolation pixel X, the output values of the band-pass filter calculated in the course of calculating the four correlation values are used. Specifically, for example, a correlation reliability value Bpf_Max is calculated from the following expression.

$$Bpf\_Max = |Bpf\_H\_G4| + |Bpf\_V\_G4|$$

The calculation of the correlation reliability value Bpf_Max is applied to four points of the pixels G4, G6, G11, and G13. Correlation value with a large correlation reliability value Bpf_Max are adopted as correlation values of the interpolation pixel X.

When an output of the band-pass filter for a pixel is large, it can be said that a signal having large amplitude is present around the pixel and the signal is generated by an image rather than by noise. Conversely, when an output of the band-pass filter is small, a signal is buried under noise and reliability of correlation is low. Thus, it is difficult to trust a correlation value. In other words, it can be said that a correlation value with a large correlation reliability value Bpf_Max has high reliability.

In the reliability calculation, correlation values with a large result of |Bpf_H−Bpf_V|, that is, a large difference value of filter outputs may be selected instead of correlation values with a large correlation reliability value Bpf_Max, that is, a large total value of filter outputs. This has an object of adopting correlation values in places with strong correlation because it can be said that the correlation values have a large difference between the output Bpf_H in the H direction and the output Bpf_V in the V direction of the band-pass filter, that is, strong correlation in the horizontal and the vertical directions.

Step S14

The correlation values in the higher order two places are averaged to obtain one correlation value. In this case, it is possible to select one correlation value in the horizontal and the vertical direction out of the four correlation values by selecting a correlation value having a largest correlation reliability value Bpf_Max. However, a satisfactory result is obtained by adopting averages of the correlation values in the higher order two places. A method of adopting correlation values in the higher order three places from the four correlation values and calculating averages of the correlation values is also conceivable.

Processing in steps S15 to S17 explained below is executed in parallel to the processing in steps S12 to S14 described above.

Step S15

Figure 12:
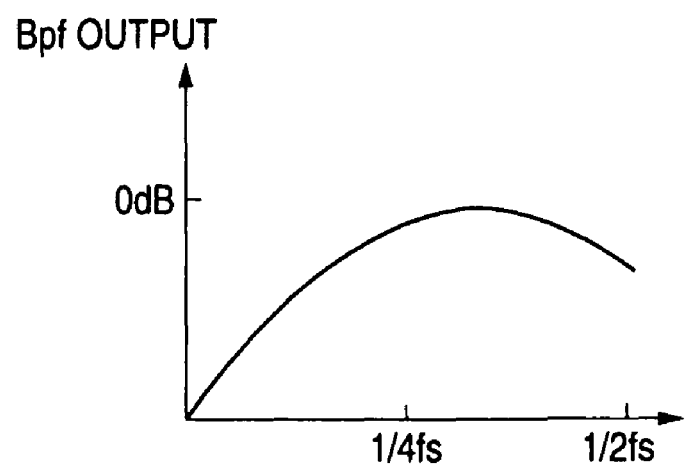
FIG. 12 is a graph showing a frequency characteristic of band-pass filters in the NH and NV directions.

First, correlation values in the NH and the NV directions are calculated (step S15). Specifically, filtering by the band-pass filter is applied in the oblique direction with the pixel G5 above the interpolation pixel X as the center. A frequency characteristic of the band-pass filter in the NH and the NV directions is shown in FIG. 12.

When an output in the NH direction of the band-pass filter is Bpf_NH_G5 and an output in the NV direction of the band-pass filter is Bpf_NV_G5, a filtering result described below is obtained.

$$Bpf\_NH\_G5 = -G1 + 2G5 - G9$$

$$Bpf\_NV\_G5 = -G2 + 2G5 - G8$$

A correlation value S_NH_G5 in the NH direction for the pixel G5 is calculated from the following expression.

$$S\_NH\_G5 = Bpf\_NV\_G5/(Bpf\_NH\_G5 + Bpf\_NV\_G5)$$

Concerning a correlation value S_NV_G5 in the NV direction, S_NV_G5=1−S_NH_G5. Thus, if only the correlation value S_NH_G5 in the NH direction is calculated, it is possible to easily calculate the correlation value S_NV_G5. Thus, the correlation value S_NV_G5 is not specifically calculated here.

As in the case of the calculation of the correlation value S_NH_G5 in the NH direction with the pixel G5 above the interpolation pixel X as the center, correlation values S_NH_G8, S_NH_G9, and S_NH_G12 in the NH direction with the pixel G8 on the left, the pixel G9 on the right, and the pixel G12 below the interpolation pixel X as the centers, respectively, are also calculated.

According to the processing described above, the correlation values S_NH_G4, S_NH_G6, S_NH_G11, and S_NH_G13 in the NH direction with the four pixels G5, G8, G9, and G12 around the interpolation pixel X, that is, above, on the left and the right, and below the interpolation pixel X as the centers, respectively, are calculated.

Step S16

Subsequently, correlation values applied to the interpolation pixel X are selected out of the four correlation values S_NH_G4, S_NH_G6, S_NH_G11, and S_NH_G13. Specifically, two correlation values having highest reliability among the four correlation values are adopted as correlation values of the interpolation pixel X (step S16). In this way, the processing for narrowing down the correlation values to two correlation values having high reliability is the same as the processing in step S13 described above.

Step S17

The correlation values in the higher order two places adopted are averaged to obtain one correlation value. The processing for calculating one correlation value is the same as the processing in step S14 described above. In this case, it is also possible to adopt a method of selecting one correlation value in the horizontal and the vertical directions out of the four correlation values or adopting correlation values in higher order three places from the four correlation values and calculating averages of the correlation values.

According to the processing described above, that is, the processing in steps S12 to S14, a correlation value S_H in the H direction is calculated. According to the processing in steps S15 to S17, a correlation value S_NH in the NH direction is calculated.

Step S18

The two correlation values S_H and S_NH are used to find in which direction correlation is strong (step S18). When the two correlation values S_H and S_NH are observed, it is seen that there is a certain characteristic. Considering a resolution chart shown in FIG. 13, directions (inclinations) of various straight lines are seen from the two correlation values S_H and S_NH.

The "resolution chart" is a chart in which the center indicates a signal having a low frequency and positions farther apart from the center indicate signals having higher frequencies. Signals having the same frequency have various directions. Therefore, it is possible to analyze what kind of processing is suitable for various signals by inputting signals in the resolution chart into a signal processor.

Figure 13:
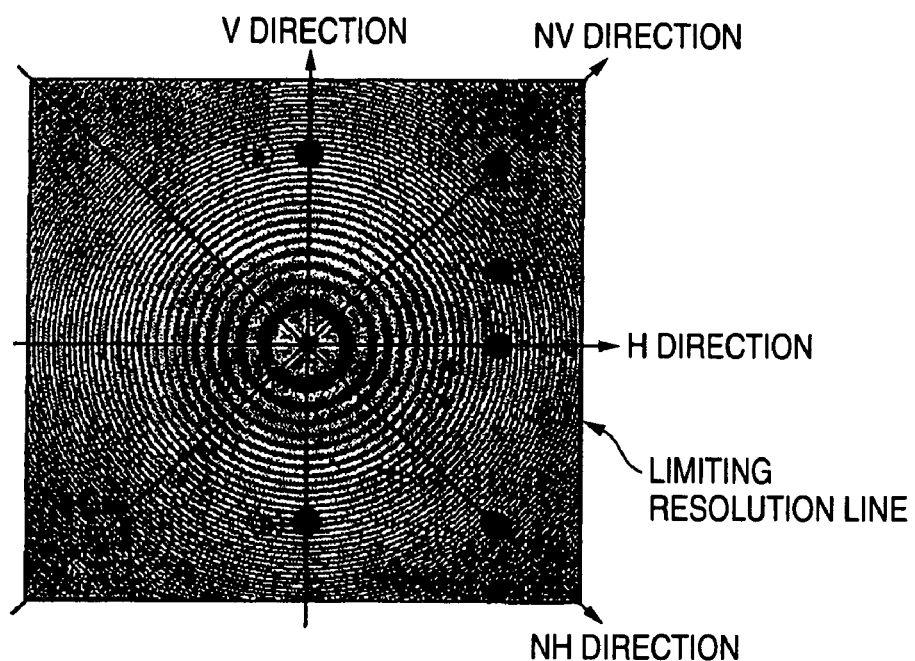
FIG. 13 is a diagram showing a resolution chart.

For example, when signals at an (a) point to an (e) point in FIG. 13 are inputted, if the processing in step S12 to S17 is performed, the two correlation values S_H and S_NH at the (a) point are as follows.

$$S\_H = 1.0 \ (S\_V = 0.0), S\_NH = 0.5 \ (S\_NV = 0.5)$$

It is seen from these correlation values that, in the H and the V directions, there is strong correlation in the H direction and, in the NH and the NV directions, correlation is the same in the NH and the NV directions, or there is no correlation.

At the (b) point, two correlation values S_H and S_NH are as follows.

$$S\_H = 0.5 \ (S\_V = 0.5), S\_NH = 1.0 \ (S\_NV = 0.0)$$

This means that there is no correlation in the H and the V directions and, in the NH and the NV directions, there is strong correlation in the NH direction.

At the (c) point, two correlation values S_H and S_NH are as follows.

$$S\_H = 0.0 \ (S\_V = 1.0), S\_NH = 0.5 \ (S\_NV = 0.5)$$

This means that, in the H and the V directions, there is strong correlation in the V direction and there is no correlation in the NH and the NV directions.

At the (d) point, two correlation values S_H and S_NH are as follows.

$$S\_H = 0.5 \ (S\_V = 0.5), S\_NH = 0.0 \ (S\_NV = 1.0)$$

This means that there is no correlation in the H and the V directions and, in the NH and the NV directions, there is strong correlation in the NV direction.

At the (e) point, two correlation values S_H and S_NH are as follows.

$$S\_H = 1.0 \ (S\_V = 0.0), S\_NH = 0.5 \ (S\_NV = 0.5)$$

This means that, as at the (a) point, in the H and the V directions, there is strong correlation in the H direction and there is no correlation in the NH and the NV directions.

Figure 14:
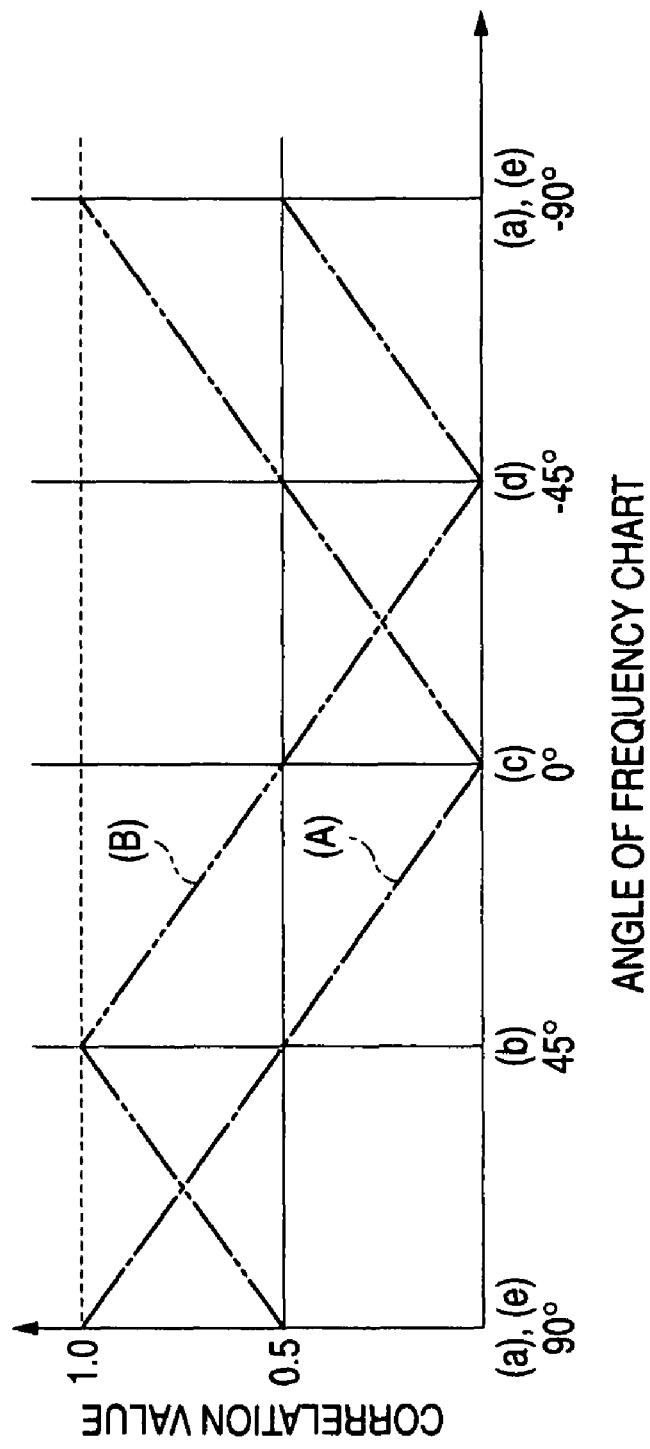
FIG. 14 is a correlation line diagram showing a relation between respective points in a frequency chart and correlation values of the points.

A relation between respective points in a frequency chart and correlation values at the points is represented as shown in FIG. 14 (this is hereinafter referred to as "correlation line"). The correlation line is obtained by calculating at least two patterns of correlation values in different directions and plotting the correlation values of the at least two patterns on straight lines of various angles. In a correlation line diagram in FIG. 14, an alternate long and short dash line (A) represents the correlation value S_H in the H and the V directions and an alternate long and two short dashes line (B) represents the correlation value S_NH in the NH and the NV directions.

When the respective points (angles) in the frequency chart are set on the abscissa, if there is correlation in a certain direction, values indicated by the alternate long and short dash line (A) and the alternate long and two short dashes line (B) indicate directional properties with strong correlation. It goes without saying that signals at the (a) point to the (e) point are distributed on the correlation line diagram in FIG. 14. The two correlation values S_H and S_NH and the correlation line diagram in FIG. 14 are compared in this way to calculate directional properties with strong correlation, that is, correlation values indicated by the alternate long and short dash line (A) and the alternate long and two short dashes line (B) (step S18).

Steps S19 and S20

It is judged whether the directional properties with strong correlation have reliability of correlation (step S19). When the two correlation values S_H and S_NH are on two correlation straight lines (A) and (B), assuming that there is reliability of correlation, the interpolation pixel X is interpolated with pixels in the direction having correlation (step S20). For example, in the case of the (a) point, since correlation in the H direction is strong, the interpolation pixel X is interpolated as X=(G8+G9)/2. In the case of the (b) point, since correlation in the NH direction is strong, the interpolation pixel X is interpolated as X=(G4+G13)/2. In the case of the (f) point where a correlation value between the (c) point and the (b) point is calculated, it is indicated that S_H=0.25 and S_NH=0.75. Thus, the interpolation pixel X is interpolated as X=(G1+G16)/2 using pixel in the direction.

Figure 15:
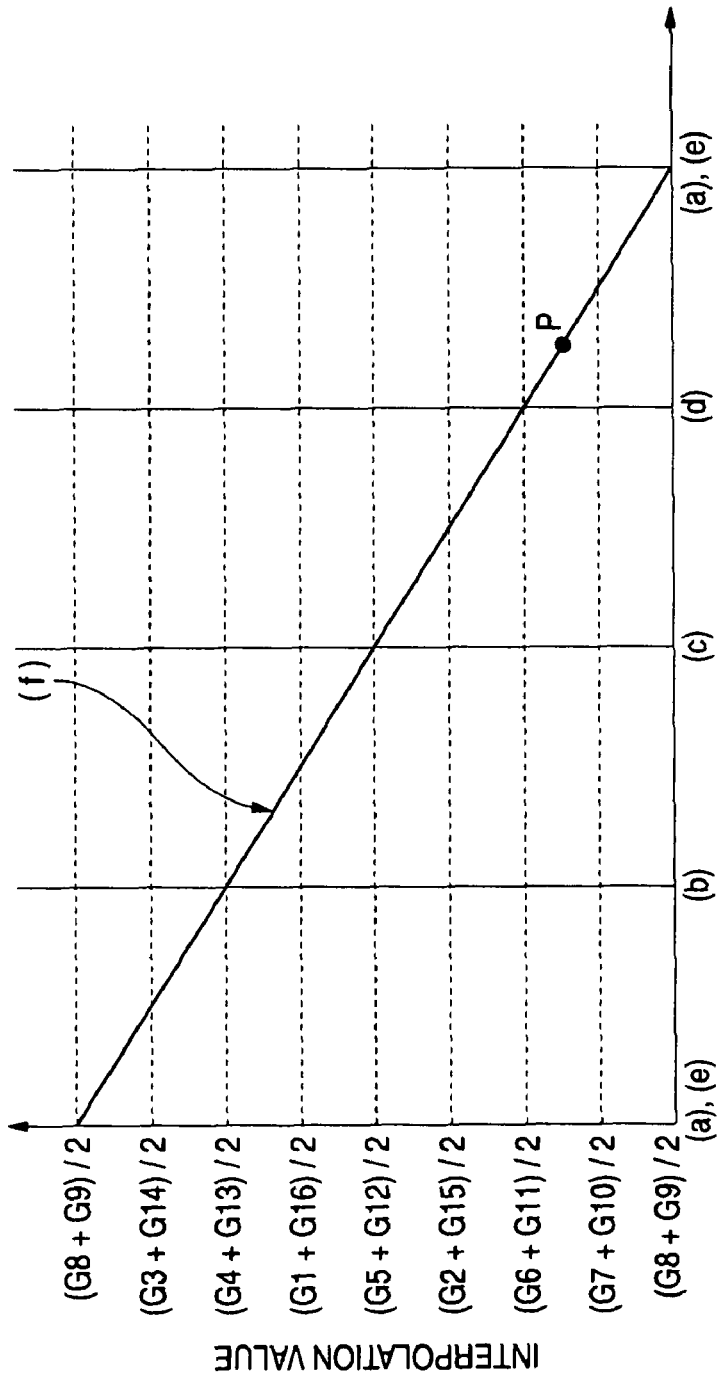
FIG. 15 is a diagram showing a relation between a correlation value and an interpolation value.

Concerning an intermediate point such as the middle between the (b) point and the (f) point, the interpolation pixel X is interpolated by weighting an interpolation value at the (b) point and an interpolation value at the (f) point. A relation between a correlation value and an interpolation value is shown in FIG. 15. At the intermediate point of correlation values, linear interpolation is performed on the basis of the relation between the correlation value and the interpolation value. As an example, in the case of a point P in FIG. 15, when a weighting coefficient is "a", the interpolation pixel is interpolated as X={(G6+G11)/2}*a+{(G7+G10)/2}*(1−a).

In this way, rather than calculating correlation values from the two directions, that is, the H and the V directions, as in the past, correlation values in the NH and the NV directions having an axis in a direction in which correlation values in the H and the V directions are exactly 0.5 and correlation is unknown, specifically, the 45° direction are calculated. Correlation in the H and the V directions and correlation in the NH and the NV directions are compared. This makes it possible to judge a correlation property (a degree of correlation) for all the directions (360°). Thus, it is possible to perform more accurate interpolation compared with the related art for calculating correlation values only in the H and the V directions. As a result, it is possible to obtain an image signal having high resolution compared with the Bayer arrangement.

Steps S19 and S21

On the other hand, when it is judged in step S19 that there is no reliability of correlation, specifically, when the two correlation values S_H and S_NH are not on the two correlation lines (A) and (B), considering that there is no correlation, S/N-oriented interpolation is performed using an average of pixels around the interpolation pixel X (step S20). For example, when S_H=1.0 and S_NH=0.5, it can be said that there is correlation. However, when S_H=1.0 and S_NH=1.0, since the correlation values S_H and S_NH are not on the correlation straight lines (A) and (B), it can be said that reliability of correlation is low. In this case, it is less likely that the interpolation pixel X can be correctly interpolated even if pixels in all the directions are used to interpolate the interpolation pixel X. Conversely, it is highly likely that wrong interpolation is performed.

When the correlation values S_H and S_NH not on the two correlation straight lines (A) and (B) are calculated in this way, it is possible to improve performance of an imaging apparatus by performing the S/N-oriented interpolation, for example, interpolating the interpolation pixel X as X=(G5+G8+G9+G12)/4 using near four pixels around the interpolation pixel X rather than performing the interpolation using resolution calculated (resolution-oriented interpolation).

In the interpolation of the Bayer arrangement described above, since it is difficult to evaluate reliability of correlation, for example, the same interpolation is applied to the NH and the NV directions. On the other hand, in the interpolation processing according to the first embodiment, a direction of correlation is calculated for all the directions (360°) to cope with interpolation in the oblique direction. Thus, as it is evident from the comparison of FIGS. 5 and 7, it is possible to obtain resolution of G in the 45° direction twice as large as that of the Bayer arrangement.

Since reliability of correlation is evaluated, it is possible to perform adaptive processing conforming to an image. For example, when it is possible to trust correlation, resolution-oriented interpolation is performed from a direction of correlation. When it is difficult to trust correlation, S/N-oriented interpolation is performed. Thus, it is possible to realize accurate interpolation processing.

For reference only, in the artificial resolution chart shown in FIG. 13, basically, high reliability of correlation is outputted in all the areas. Low reliability of correlation could occur in a subject mixed with complicated curves such as a gravel road and bushes in a general image.

It is possible to execute the series of interpolation processing according to the first embodiment with, for example, software processing by a microcomputer. However, the processing is not limited to software processing. It is also possible to execute the processing with hardware processing.

Figure 16:
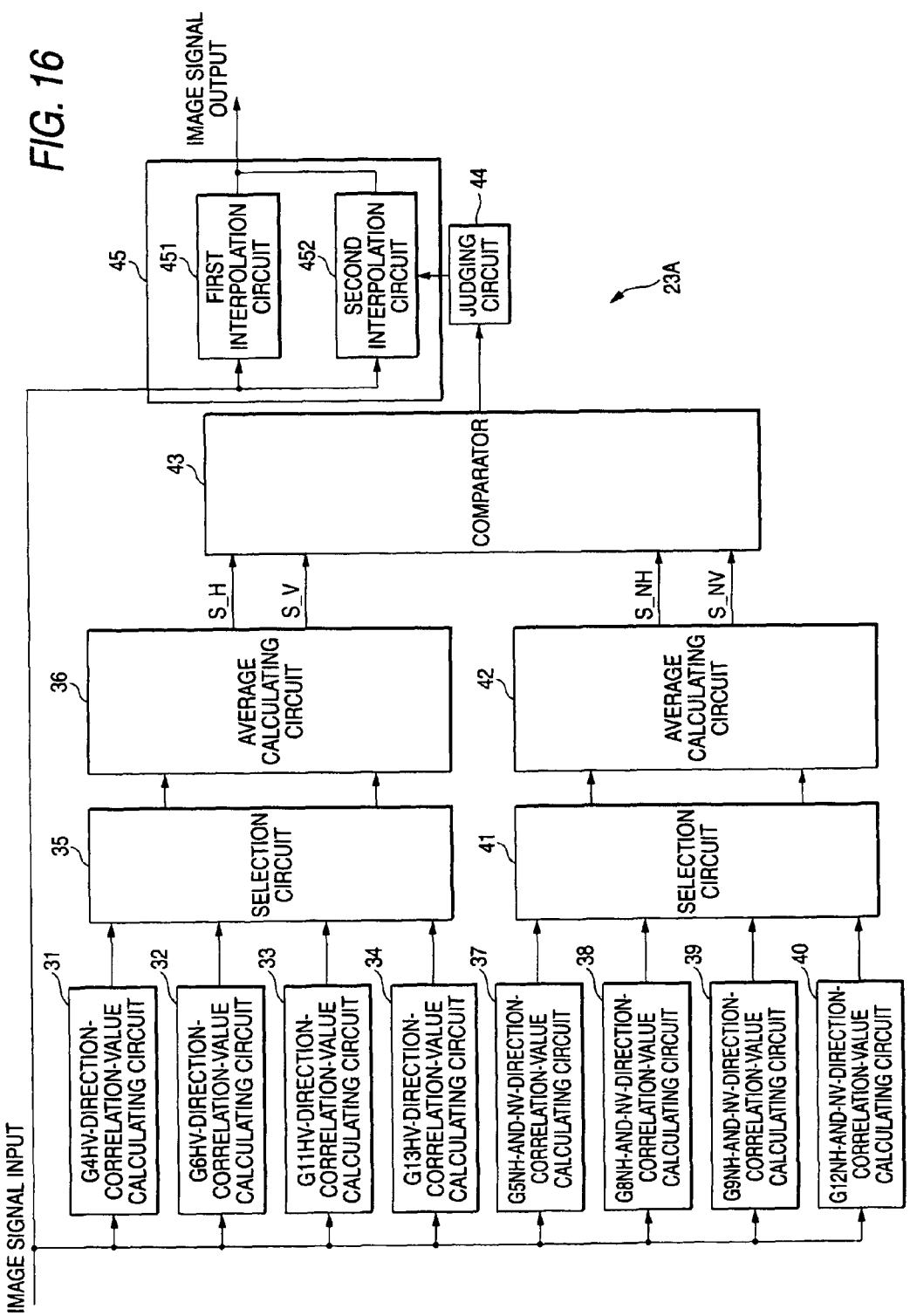
FIG. 16 is a block diagram showing an example of a constitution of an interpolation processor that executes the interpolation processing according to the first embodiment.

FIG. 16 is a block diagram showing an example of an interpolation processor 23A of a hardware configuration that executes the interpolation processing according to the first embodiment.

In FIG. 16, a G4HV-direction-correlation-value calculating circuit 31 includes, for example, a band-pass filter having the frequency characteristic shown in FIG. 11. The G4HV-direction-correlation-value calculating circuit 31 calculates correlation values in the H and the V directions by applying filtering processing to the H and the V directions with the pixel G4 at the obliquely upper left of the interpolation pixel X as the center.

Specifically, a correlation value S_H_G4 in the H direction for the pixel G4 is calculated from the following expression.

$$S\_H\_G4 = Bpf\_V/(Bpf\_H + Bpf\_V)$$

A correlation value S_V_G4 in the V direction is calculated from the following expression.

$$S\_V\_G4 = 1 - S\_H\_G4.$$

Like the G4HV-direction-correlation-value calculating circuit 31, G6, G11, and G13-HV-direction-correlation-value calculating circuits 32, 33, and 34 calculate correlation values S_H_G6, S_H_G11, and S_H_G13 in the H direction and correlation values S_V_G6, S_V_G11, and S_V_G13 in the V direction with the pixel G6 at the obliquely upper right, the pixel G11 at the obliquely lower left, and the pixel G13 at the obliquely lower right of the interpolation pixel X as the centers, respectively.

A selection circuit 35 selects, for each of the H direction and the V direction, correlation values applied to the interpolation pixel X out of four correlation values. Specifically, the selection circuit 35 adopts two correlation values having a largest correlation reliability value Bpf_Max, that is, two correlation values having highest reliability, as correlation values of the interpolation pixel X out of the four correlation values by comparing output values of the band-pass filter calculated in the course of calculating the four correlation values. An average calculating circuit 36 calculates averages of the correlation values in the higher order two places selected by the selection circuit 35 and outputs the averages as correlation values S_H and S_V in the H and the V directions, respectively.

AG5NH-and-NV-direction-correlation-value calculating circuit 37 includes, for example, a band-pass filter having the frequency characteristic shown in FIG. 12. The G5NH-and-NV-direction-correlation-value calculating circuit 37 calculates correlation values in the NH and the NV directions by applying filtering processing to the NH and the NV directions with the pixel G5 above the interpolation pixel X as the center.

Specifically, the G5NH-and-NV-direction-correlation-value calculating circuit 37 calculates a correlation value S_NH_G5 in the NH direction for the pixel G5 from the following expression.

$$S\_NH\_G5 = Bpf\_NV\_G5/(Bpf\_NH\_G5 + Bpf\_NV\_G5)$$

The G5NH-and-NV-direction-correlation-value calculating circuit 37 calculates a correlation value S_NV_G5 in the NV direction from the following expression.

$$S\_NV\_G5 = 1 - S\_NH\_G5$$

Like the G5NH-and-NV-direction-correlation-value calculating circuit 37, G8, G9, and G12NH-and-NV-direction-correlation-value calculating circuits 38, 39, and 40 calculate correlation values S_NH_G8, S_NH_G9, and S_NH_G12 in the NH direction and correlation values S_NV_G8, S_NV_G9, and S_NV_G12 in the NV direction with the pixel G8 on the left, the pixel G9 on the right, and the pixel G12 below the interpolation pixel X as the centers, respectively.

A selection circuit 41 selects, for each of the NH direction and the NV direction, correlation values applied to the interpolation pixel X out of four correlation values. Specifically, the selection circuit 41 adopts two correction values having a largest correlation reliability value Bpf_Max, that is, two correlation values having highest reliability among the four correlation values as correlation values of the interpolation pixel X by comparing output values of the band-pass filter calculated in the course of calculating the four correlation values.

An average calculating circuit 42 calculates averages of the correlation values in the higher order two places selected by the selection circuit 41 and outputs the averages as correlation values S_NH and S_NV in the NH and the NV directions, respectively. The correlation value calculating circuits 31 to 34 and 37 to 40, the selection circuits 35 and 41, and the average calculating circuits 36 and 42 constitute correlation value calculating means in the invention.

A comparator 43 judges directional properties with strong correlation, or judges in which direction correlation is strong, by comparing the correlation values S_H and S_V in the H and the V directions calculated by the average calculating circuit 36 and the correlation values S_NH and S_NV in the NH and the NV directions calculated by the average calculating circuit 42 with the correlation line diagram in FIG. 14.

A judging circuit 44 judges whether there is reliability of correlation concerning a result of the calculation by comparator 43, that is, directional properties with strong correlation. When the two correlation values S_H and S_NH are on the two correlation straight lines (A) and (B), the judging circuit 44 considers that there is correlation. When the two correlation values S_H and S_NH are not on the two correlation straight lines (A) and (B), the judging circuit 44 considers that there is no correlation. The judging circuit 44 gives a result of the judgment to an interpolation circuit 45. The comparator 43 and the judging circuit 44 constitute judging means in the invention.

The interpolation circuit 45 includes a first interpolation circuit 451 that applies resolution-oriented interpolation processing to the interpolation pixel X and a second interpolation circuit 452 that applies S/N-oriented interpolation processing to the interpolation pixel X. When a result of judgment indicating that reliability of correlation is high is given from the judging circuit 44, the first interpolation circuit 451 interpolates the interpolation pixel X using pixels in a direction having correlation. The interpolation processing performed using pixels in a direction having correlation in this way is the resolution-oriented interpolation processing.

When a result of judgment indicating that reliability of correlation is low is given from the judging circuit 44, the second interpolation circuit 452 interpolates the interpolation pixel X using an average of pixels around the interpolation pixel X. For example, the second interpolation circuit 452 interpolates the interpolation pixel X as X=(G5+G8+G9+G12)/4 using four near pixels around the interpolation pixel X. The interpolation processing performed using an average of pixels around the interpolation pixel X is the S/N-oriented interpolation processing.

In the first embodiment, the G4, G6, G11, and G13HV-direction-correlation-value calculating circuits 31, 32, 33, and 34 and the G5, G8, G9, and G12NH-and-NV-direction-correlation-value calculating circuits 37, 38, 39, and 40 are constituted using the band-pass filter. However, a component constituting the correlation value calculating circuits is not limited to the band-pass filter. For example, it is also possible to constitute the correlation value calculating circuits using a high-pass filter. Alternatively, it is also possible to constitute the correlation value calculating circuits as high-pass filters by combining a low-pass filter and an inverter that inverts an output of the low-pass filter.

As described above, in order to realize high luminance resolution compared with the Bayer arrangement in the past, plural correlation values are calculated for the solid-state imaging device having the filter of the first example of color coding in which the component G serving as a main component in creating a luminance component is present in eight pixels in the horizontal, the vertical, and the oblique directions with respect to the interpolation pixel X, that is, the pixels G4, G5, G6, G8, G9, G11, G12, and G13. The plural correlation values are compared with a correlation line diagram. This makes it possible to judge correlation properties for all the directions (360°). Thus, it is possible to apply appropriate interpolation to the first example of color coding and obtain an image signal having high resolution compared with the Bayer arrangement in the past.

In particular, according to comparison of the plural correlation values and the correlation line diagram, a method for interpolation is changed depending on whether reliability of correlation is high or low. Specifically, when it is judged that reliability of correlation is high, resolution-oriented interpolation is performed using information on pixels in a direction in which reliability of correlation is high. When it is judged that reliability of correlation is low, S/N-oriented interpolation is performed using a value obtained by averaging information on pixels around the interpolation pixel. This makes it possible to realize high-performance interpolation processing with higher resolution and resistive to S/N.

Second embodiment

FIG. 17 is a diagram showing a second example of color coding subjected to interpolation processing according to a second embodiment of the invention. As shown in FIG. 17, the second example of color coding is a so-called oblique pixel arrangement in which, compared with the pixel pitches d of the pixel arrangement of the square lattice shape shown in FIG. 6, respective pitches in the horizontal and the vertical directions are set to $\sqrt{2}$ d and respective pixels are shifted by ½ of the pixel pitches $\sqrt{2}$ d for each row and each column (pixels are shifted by ½ of the pixel pitches in the horizontal direction in odd number rows and even number rows and shifted by ½ of the pixel pitches in the vertical directions in odd number columns and even number columns). A first row is a GR line in which the color components G and R are alternately arranged, a second row is a G line in which only the color components G are arranged, a third row is a GB line in which the color components G and B are alternately arranged, and a fourth row is a G line in which only the color components G are arranged. In the following rows, pixels are repeatedly arranged with the four rows as a unit.

In the second example of color coding, as in the first example of color coding, as it is evident from FIG. 17, color components (in this example, G) serving as main components in creating a luminance (Y) component and other color components (in this example, R and B) are arranged such that the color components G surround the color components R and B. The color components R and B are arranged at intervals of $2\sqrt{2}$ d in the horizontal and the vertical directions. As it is evident from comparison of FIGS. 17 and 6, this color coding is exactly color coding in which the color arrangement in the first example of color coding is inclined 45°.

In the second example of color coding, considering sampling rates in the horizontal and the vertical directions, a sampling rate for G is d/$\sqrt{2}$ and a sampling rate for R and B is $2\sqrt{2}$ d. In other words, the color components R and B are arranged in every other column (in this example, odd number columns) and every other row (in this example, odd number rows) such that sampling rates in the horizontal and the vertical directions are rates that is ¼ the sampling rate for G. Therefore, resolution in the horizontal and the vertical directions of the color components G is four times as large as that of the color components R and B. Considering a sampling rate in the 45° direction, a sampling rate for G is d and a sampling rate for R and B is 2 d.

A spatial frequency characteristic will be considered. In the horizontal and the vertical directions, since the sampling rate for G is d/$\sqrt{2}$, it is possible to catch a signal having a frequency up to (1/$\sqrt{2}$) fs according to the sampling theorem. In the 45° direction, since the sampling rate for G is d, it is possible to catch a signal having a frequency up to (¼) fs according to the sampling theorem.

The color components R and B will be considered in the same manner. Since intervals of pixel arrangement of R and B are the same, only the color component R will be described. Concerning a spatial frequency characteristic of R, in the horizontal and the vertical directions, since the sampling rate for R is 2≧2 d, it is possible to catch a signal having a frequency up to (¼$\sqrt{2}$) fs according to the sampling theorem. In the 45° direction, since the sampling rate for R is 2 d, it is possible to catch a signal having a frequency up to (½) fs according to the sampling theorem.

A solid-state imaging device having the oblique pixel arrangement can obtain high resolution because pixel pitches are narrow compared with the pixel arrangement of the square lattice shape. When resolution is the same as resolution of the pixel arrangement of the square lattice shape, it is possible to arrange pixels at pixel pitches wider than the pixel pitches of the pixel arrangement of the square lattice shape. Thus, it is possible to form openings of the pixels wide. As a result, it is possible to improve S/N.

The second embodiment is characterized by correction processing for the second example of color coding in FIG. 17. The correction processing will be hereinafter specifically explained.

FIG. 18 is a diagram representing the second example of color coding in FIG. 17 as a square lattice. It is seen from FIG. 18 that the arrangement of G in the first example of color coding (see FIG. 6) and an arrangement of G in FIG. 18 are in a relation in which the one arrangement is rotated from the other arrangement by 45°. Consequently, it is seen that it is possible to accurately interpolate G pixels in spatial positions of R and B pixels by performing the interpolation processing according to the first embodiment in a positional relation rotated by 45°.

FIG. 19 is a block diagram showing an example of a constitution of an interpolation processor 23B that executes the interpolation processing according to the second embodiment. As shown in FIG. 19, the interpolation processor 23B according to this example has a two-stage constitution including a pre-stage interpolation processor 231 and a post-stage interpolation processor 232.

Figures 20, 21:
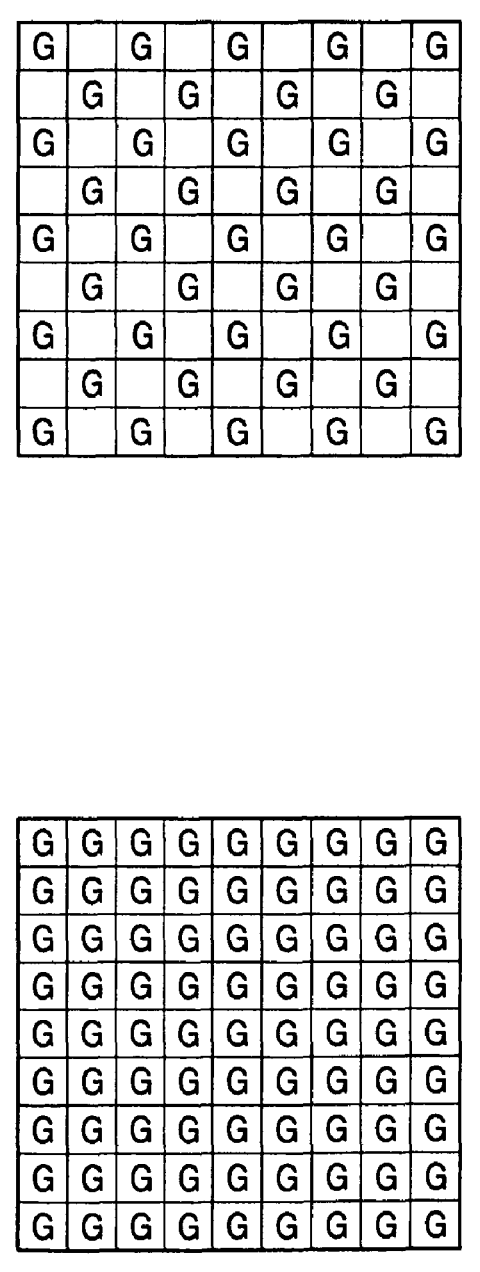

The pre-stage interpolation processor 231 basically has the same function as the interpolation processing according to the first embodiment. The pre-stage interpolation processor 231 performs processing for interpolating G pixels in spatial positions of R and B pixels in the pixel arrangement of G in FIG. 18 using the function. A result of the interpolation processing by the pre-stage interpolation processor 231, that is, a result of interpolating the G pixels in the spatial positions of the R and B pixels in the pixel arrangement of G in FIG. 18 is shown in FIG. 20. An arrangement of G in FIG. 20 is accurately interpolated according to this interpolation processing. When attention is paid to the arrangement of G in FIG. 20, it is seen that G pixels are arranged in a checkered pattern.

The post-stage interpolation processor 232 basically has the same function as the interpolation processing for the Bayer arrangement described above. The post-stage interpolation processor 232 applies interpolation processing to a pixel arrangement of G in FIG. 20 using the function. According to the interpolation processing for the Bayer arrangement, G is generated for all the pixels from G arranged in the checkered pattern. A result of the interpolation processing by the post-stage interpolation processor 232, that is, a result of interpolating G arranged in the checkered pattern to arrange G in all the pixels is shown in FIG. 21.

As described above, for the second example of color coding in FIG. 17, it is also possible to obtain resolution up to limiting resolution by combining the interpolation processing by the pre-stage interpolation processor 231, that is, the interpolation processing according to the first embodiment, and the interpolation processing by the post-stage interpolation processor 232, that is, the interpolation processing for the Bayer arrangement.

Figure 22:
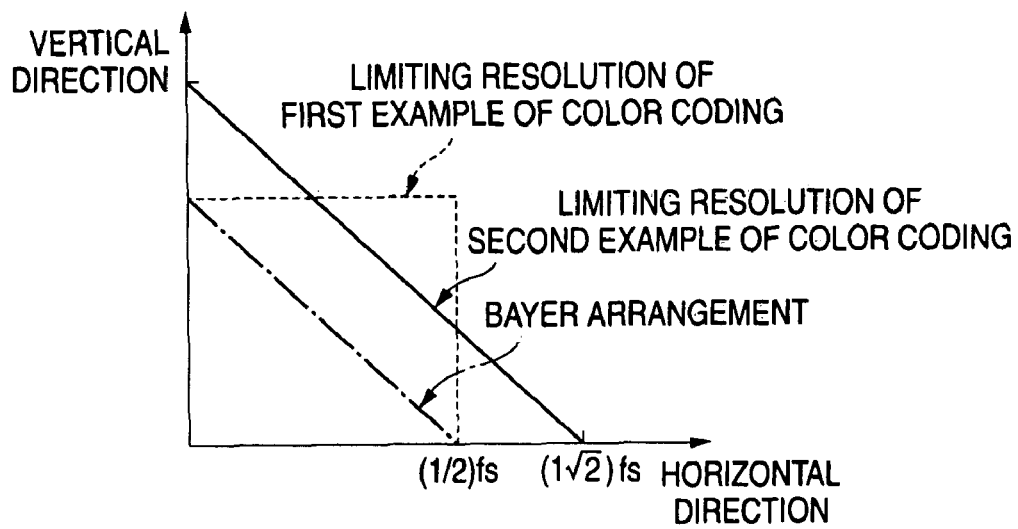
FIG. 22 is a diagram showing spatial resolution characteristics in the Bayer arrangement, the first example of color coding, and the second example of color coding.

Spatial resolution characteristics in the Bayer arrangement, the first example of color coding, and the second example of color coding are shown in FIG. 22. When resolution of the first example of color coding and resolution of the second example of color coding are compared, the resolution of the second example of color coding is more advantageous in the horizontal and the vertical directions. In general, in photographing a subject with a camera, in an image including straight line components, pixels are often distributed in the horizontal and the vertical directions. From this viewpoint, it can be said that the second example of color coding is more advantageous than the first example of color coding.

Considering that an output of the camera signal processor 14 (see FIG. 1) needs to be a square lattice shape, the second example of color coding has an advantage that it is possible to set an output size twice as large as the number of pixels. It goes without saying that it is seen from FIG. 22 that the resolution of the second example of color coding is remarkably high compared with that of the Bayer arrangement.

In the camera signal processor 14, it is possible to obtain the operational effects described above by using the interpolation processor 23B in the second embodiment directly as the interpolation processor 23. However, it is also possible to adopt a constitution described below as a modification of the embodiment. An interpolation processor 23B' according to the modification is shown in FIG. 23.

Figure 23:
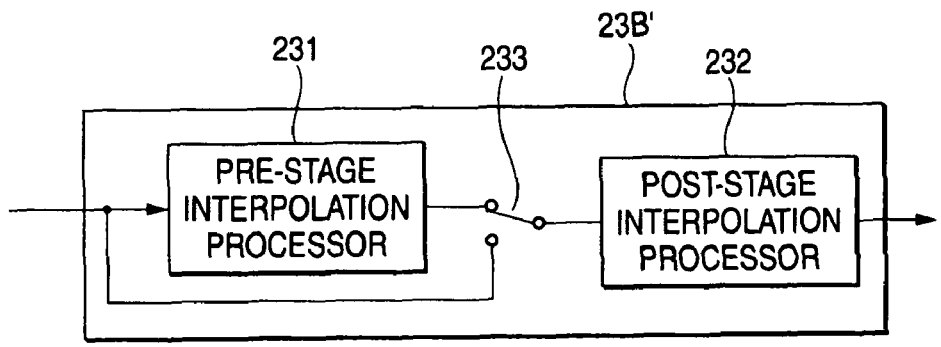
FIG. 23 is a block diagram showing a modification of the interpolation processor that executes the interpolation processing according to the second embodiment.
Figure 24:
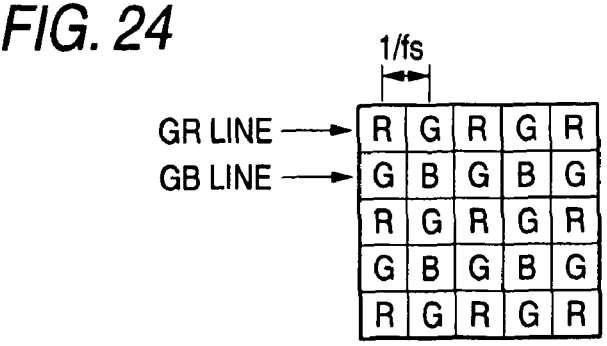
FIG. 24 is a diagram showing color coding of the Bayer arrangement.

Specifically, as shown in FIG. 23, a changeover switch 233 is provided on an input side of the post-stage interpolation processor 232 to make it possible to selectively input one of an output signal of the pre-stage interpolation processor 231 and an output signal of the WB circuit 22 (see FIG. 1) (an input signal of the pre-stage interpolation processor 231) to the post-stage interpolation processor 232. By adopting such a constitution, it is possible to cope with solid-state imaging devices of two types, namely, the example 2 of color coding and the Bayer arrangement, using one camera system.

In the embodiments described above, the first and the second examples of color coding are explained as examples of color coding in which the color components G serving as main components in creating a luminance component surround the color components R and B. However, color coding to which the invention is applicable is not limited to the first and the second example of color coding. For example, color coding having the following arrangement of pixels may be adopted. In the color coding, with respect to the pixel arrangement of the square lattice shape, pixels are arranged in repetition of RGGG with four pixels in the horizontal direction as a unit in the first row, only G pixels are arranged in the second row, pixels are arranged in repetition of GGBG with four pixels in the horizontal direction as a unit in the third row, only G pixels are arranged in the fourth row, and, in the following rows, pixels are arranged with the four rows as a unit.

According to the embodiments of the invention, it is possible to judge a direction of correlation in all the directions (360°) with respect to a pixel of attention to be interpolated. This makes it possible to perform appropriate interpolation processing on the basis of the direction judged.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An image processing device, comprising:
   correlation value calculating means for calculating plural correlation values indicating degrees of correlation of an image for a pixel of attention to be interpolated on a solid-state imaging device having filters of predetermined color coding;
   judging means for judging a direction in which interpolation should be performed by calculating, in different directions, at least two patterns of the plural correlation values calculated by the correlation value calculating means and comparing the correlation values of at least two patterns with correlation lines obtained by plotting the correlation values with respect to straight lines of various angles; and
   interpolating means for applying interpolation processing to the pixel of attention on the basis of information on pixels around the pixel of attention present in the direction judged by the judging means,
   wherein:
   the correlation value calculating means calculates an average of higher order plural correlation values with high correlation among the plural correlation values, and
   the judging means judges, on the basis of the average of the higher order plural correlation values, a direction in which interpolation should be performed.

2. An image processing device according to claim 1, wherein the correlation value calculating means calculates the plural correlation values with pixels around the pixel of attention as centers.

3. An image processing device according to claim 1, wherein the correlation value calculating means calculates the plural correlation values from a ratio of a first filter output obtained by applying filtering processing by a first band-pass filter to a first direction and a second filter output obtained by applying filtering processing by a second band-pass filter, which has a same filter characteristic as the first band-pass filter, to a second direction.

4. An image processing device according to claim 1, wherein the different directions are directions shifted from each other by 45°.

5. An image processing device according to claim 4, wherein the judging means determines, when two correlation values for the different directions are on a correlation line, that reliability of correlation is high and determines, when the two correlation values are not on a correlation line, that reliability of correlation is low.

6. An image processing device according to claim 5, wherein, when the judging means determines that the reliability of correlation is high, the interpolating means performs interpolation using information on pixels around the pixel of attention present in the direction judged by the judging means, and when the judging means determines that the reliability of correlation is low, the interpolating means performs interpolation using an average of the information on the pixels around the pixel of attention.

7. An image processing device according to claim 1, wherein, in the predetermined color coding, with respect to a pixel arrangement in which pixels are arranged in a square lattice shape to be arranged at equal intervals in a horizontal direction and a vertical direction, color components serving as main components in creating a luminance component are arranged to surround respective other color components.

8. An image processing device according to claim 1, wherein, in the predetermined color coding, with respect to an oblique pixel arrangement in which pixels are shifted by ½ of pixel pitches for each row and for each column, color components serving as main components in creating a luminance component are arranged to surround respective other color components.

9. An image processing device according to claim 1, further comprising:
pre-stage interpolation processing means for changing color coding for the oblique pixel arrangement to color coding of a Bayer arrangement according to interpolation processing; and
post-stage interpolation processing means for applying Bayer interpolation processing using interpolation to the color coding of the Bayer arrangement,
wherein the pre-stage interpolation processing means includes:
correlation value calculating means for calculating plural correlation values indicating degrees of correlation of an image for the pixel of attention to be interpolated;
judging means for judging a direction in which interpolation should be performed by calculating, in different directions, at least two patterns of the plural correlation values calculated by the correlation value calculating means, and comparing the correlation values of at least two patterns with correlation lines obtained by plotting the correlation values with respect to straight lines of various angles; and
interpolating means for applying interpolation processing to the pixel of attention on the basis of information on pixels around the pixel of attention present in the direction judged by the judging means.

10. An image processing device, comprising:
a correlation value calculating unit calculating plural correlation values indicating degrees of correlation of an image for a pixel of attention to be interpolated on a solid-state imaging device having filters of predetermined color coding;
a judging unit judging a direction in which interpolation should be performed by calculating, in different directions, at least two patterns of the plural correlation values calculated by the correlation value calculating unit and comparing the correlation values of at least two patterns with correlation lines obtained by plotting the correlation values with respect to straight lines of various angles; and
an interpolating unit applying interpolation processing to the pixel of attention on the basis of information on pixels around the pixel of attention present in the direction judged by the judging unit,
wherein:
the correlation value calculating unit calculates an average of higher order plural correlation values with high correlation among the plural correlation values, and
the judging unit judges, on the basis of the average of the higher order plural correlation values, a direction in which interpolation should be performed.

11. An image processing device according to claim 10, further comprising:
a pre-stage interpolation processing unit changing color coding for the oblique pixel arrangement to color coding of a Bayer arrangement according to interpolation processing; and
a post-stage interpolation processing unit applying Bayer interpolation processing using interpolation to the color coding of the Bayer arrangement,
wherein the pre-stage interpolation processing unit includes:
a correlation value calculating unit calculating plural correlation values indicating degree of correlation of an image for the pixel of attention to be interpolated;
a judging unit judging a direction in which interpolation should be performed by calculating, in different directions, at least two patterns of the plural correlation values calculated by the correlation value calculating unit, and comparing the correlation values of at least two patterns with correlation lines obtained by plotting the correlation values with respect to straight lines of various angles; and
an interpolating unit applying interpolation processing to the pixel of attention on the basis of information on pixels around the pixel of attention present in the direction judged by the judging unit.

12. An image processing method, comprising:
calculating plural correlation values indicating degrees of correlation of an image for a pixel of attention to be interpolated on a solid-state imaging device having filters of predetermined color coding;
judging a direction in which interpolation should be performed by calculating, in different directions, at least two patterns of the plural correlation values calculated in the calculating step and comparing the correlation values of at least two patterns with correlation lines obtained by plotting the correlation values with respect to straight lines of various angles; and
applying interpolation processing to the pixel of attention on the basis of information on pixels around the pixel of attention present in the direction judged in the judging step,
wherein:
the calculating calculates an average of higher order plural correlation values with high correlation among the plural correlation values, and
the judging judges, on the basis of the average of the higher order plural correlation values, a direction in which interpolation should be performed.

13. An imaging apparatus, comprising:
a solid-state imaging device having a filter of predetermined color coding; and
an image processing device processing an output signal of the solid-state imaging device,
wherein the image processing device includes:
correlation value calculating means for calculating plural correlation values indicating degrees of correlation of an image for a pixel of attention to be interpolated on the solid-state imaging device;
judging means for judging a direction in which interpolation should be performed by calculating, in different directions, at least two patterns of the plural correlation values calculated by the correlation value calculating means and comparing the correlation values of at least two patterns with correlation lines obtained by plotting the correlation values with respect to straight lines of various angles; and
interpolating means for applying interpolation processing to the pixel of attention on the basis of information on pixels around the pixel of attention present in the direction judged by the judging means, wherein:

the correlation value calculating means calculates an average of higher order plural correlation values with high correlation among the plural correlation values, and the judging means judges, on the basis of the average of the higher order plural correlation values, a direction in which interpolation should be performed.

14. An image processing apparatus for processing an image obtained by an imaging device with a color filter for color coding, the apparatus comprising:

an input unit inputting an image signal;

a correlation value calculating unit calculating a multiplicity of correlation values indicating degrees of correlation of the image;

a selecting unit selecting, from among the multiplicity of correlation values, a first correlation value and a second correlation value having highest reliability;

an identifying unit identifying pixels which are used to interpolate another pixel based on an average of the first correlation value and the second correlation value; and an interpolating unit interpolating the pixel using the identified pixels.

15. An image processing apparatus according to claim 14, wherein the first correlation value and the second correlation value are calculated based on a ratio of a first filter output obtained by filtering processing by a first band-pass filter and a second filter output obtained by applying filtering processing by a second band-pass filter.

16. An image processing apparatus according to claim 15, wherein the first band-pass filter and the second band-pass filter have directions different from each other.

17. An image processing apparatus according to claim 16, wherein the different directions are directions shifted from each other by 45°.

18. An image processing apparatus according to claim 16, wherein the identifying unit identifies the pixels which are used to interpolate another pixel by comparing the first correlation value and the second correlation value on the basis of a correlation in 360° directions.

19. An image processing apparatus according to claim 14, wherein color components serving as main components in creating a luminance component are arranged on the color filter so as to surround respective other color components with respect to a pixel arrangement in which respective pixels are arranged in a square lattice shape such that the pixels are arranged at equal intervals in the horizontal direction and the vertical direction, wherein the color components serving as main components surround respective other color components by a ratio of 8 to 1.

20. An image processing apparatus according to claim 14, wherein color components serving as main components in creating a luminance component are arranged on the color filter so as to surround respective other color components with respect to an oblique pixel arrangement in which pixels are shifted by ½ of pixel pitches for each row and for each column.

21. An image processing apparatus according to claim 20, further comprising:

a pre-stage interpolation processing unit changing color coding for the oblique pixel arrangement to color coding of a Bayer arrangement according to interpolation processing; and a post-stage interpolation processing unit applying Bayer interpolation processing using interpolation to the color coding of the Bayer arrangement.

22. An image processing apparatus for processing an image obtained by an imaging device with a color filter for color coding, the apparatus comprising:

an input unit inputting an image signal;

a correlation value calculating unit calculating a multiplicity of correlation values wherein each correlation value comprises a ratio of values, each value being determined from at least three pixels;

a reliability calculation unit calculating a reliability of each one of the multiplicity of correlation values;

a selecting unit selecting, from among the multiplicity of correlation values, a first correlation value and a second correlation value having highest reliability; and an identifying unit identifying pixels which are used to interpolate another pixel based on an average of the first correlation value and the second correlation value; and an interpolating unit interpolating a pixel by interpolation processing using the selected identified pixels.

23. An image processing apparatus according to claim 22, wherein, when the reliability is outside a predetermined range, the interpolating unit performs interpolation using an average of the information on the pixels around the pixel to be interpolated.

* * * * *